Figure 3:
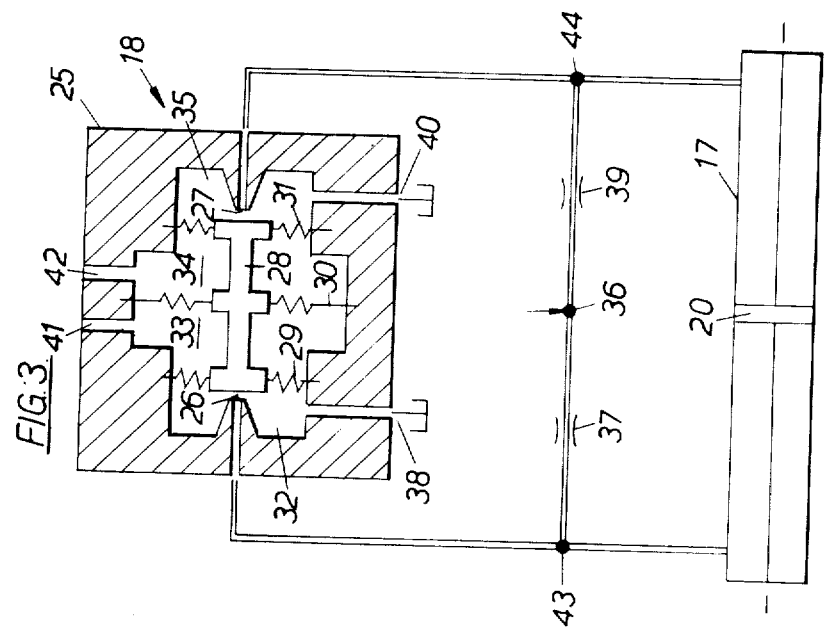

United States Patent [19]
Kellner

[11] 3,897,717
[45] Aug. 5, 1975

[54] CONTROL VALVES

[75] Inventor: Michael Kellner, Stanley, England

[73] Assignee: Victor Products (Wallsend) Limited, Wallsend, England

[22] Filed: Sept. 19, 1973

[21] Appl. No.: 398,705

[30] Foreign Application Priority Data
Sept. 28, 1972 United Kingdom............... 44833/72

[52] U.S. Cl. ........................ 91/51; 91/419; 137/46
[51] Int. Cl. ............................................. F16k 17/36
[58] Field of Search .................. 137/45, 46, 82, 85;
33/313, 391, 397; 91/51, 419; 172/4.5; 244/80

[56] References Cited
UNITED STATES PATENTS

| 2,520,266 | 8/1950 | Adams | 91/419 X |
| 2,944,526 | 7/1960 | Jarvis | 91/51 |
| 3,031,846 | 5/1962 | Wiegand | 91/51 |
| 3,437,010 | 4/1969 | Jacobi | 137/46 UX |
| 3,754,562 | 8/1973 | Gustafsson | 137/45 |

FOREIGN PATENTS OR APPLICATIONS

| 1,249,548 | 10/1971 | United Kingdom | |
| 1,072,468 | 6/1967 | United Kingdom | 172/4.5 |

Primary Examiner—Robert G. Nilson
Attorney, Agent, or Firm—Brisebois & Kruger

[57] ABSTRACT

A hydraulic control valve comprises a fixed restrictor and a variable restrictor connected in series in a hydraulic fluid conduction path between a fluid inlet and a fluid outlet. The variable restrictor comprises an obstructing member which is held in a substantially fixed position by a suspended mass and an orifice which is movable with a member which supports it and the suspended mass. The obstructing member cooperates with the orifice to control the resistance to the flow of fluid through the path so that the output pressure at the junction between the restrictors varies with the attitude of the support member. The valve may comprise two such paths in parallel controlled by a common mass to provide a pressure differential between the two said junctions. The valve having a single conduction path or the valve having two conduction paths as above may also have, respectively, one or two further paths each having an orifice in a plane at an angle to the abovementioned orifice or orifices, the variable restrictors being controlled by a common mass.

8 Claims, 4 Drawing Figures

CONTROL VALVES

This invention relates to control valves for controlling, for example, the operation of hydraulic actuators such as rams or hydraulic motors.

It is frequently necessary to set the attitude of a member, such as an instrument platform or a member forming part of a heavy piece of equipment, so that at least one axis of the member is maintained at a predetermined angle to the horizontal, irrespective of the attitude of the means supporting the member.

It is an object of the present invention to provide a valve which can be used to control automatically the operation of one or more hydraulic actuators to set the attitude of a member.

According to the invention, a control valve includes a support member; a fixed restrictor; and a variable restrictor connected in series with the fixed restrictor in a fluid conduction path between an inlet and an outlet for hydraulic fluid, the variable restrictor comprising an orifice which is movable with the support member, and an obstructing member which is held substantially in a predetermined attitude by a mass suspended from the support member so that the attitude of the obstructing member is independent of the attitude of the support member within a range of attitudes, the obstructing member cooperating with the orifice to control the resistance to the flow of fluid through said path, whereby the output pressure at a junction between the restrictors varies with the attitude of the support member within said range.

In a preferred embodiment of the invention, the control valve includes two such conduction paths connected in parallel between the inlet and outlet, each path containing fixed and variable restrictors, the variable restrictors having a common obstructing member or separate obstructing members controlled by a common suspended mass, the obstructing member or members being effective to control differentially the resistance to the flow of fluid through the two paths, whereby a pressure differential is obtained at the junctions between the fixed and variable restrictors, which pressure differential varies with the attitude of the support member within said range.

The valve having a single conduction path or the valve having two conduction paths as aforesaid may also have, respectively, one or two further paths each having an orifice in a plane at an angle, for example 90°, to the aforesaid orifice or orifices, respectively, the variable restrictors having a common obstructing member or separate obstructing members controlled by a common suspended mass.

The output pressure(s) or the output pressure differential(s) as the case may be, may be used to operate one or more hydraulic actuators, either directly or via second stage valves, to control the attitude of the support member, which is preferably a valve housing. The support member may be mounted on a further member, such as an instrument table, and the attitude of the support member may be set by controlling the attitude of the further member by means of the actuator or actuators.

Figure 1:
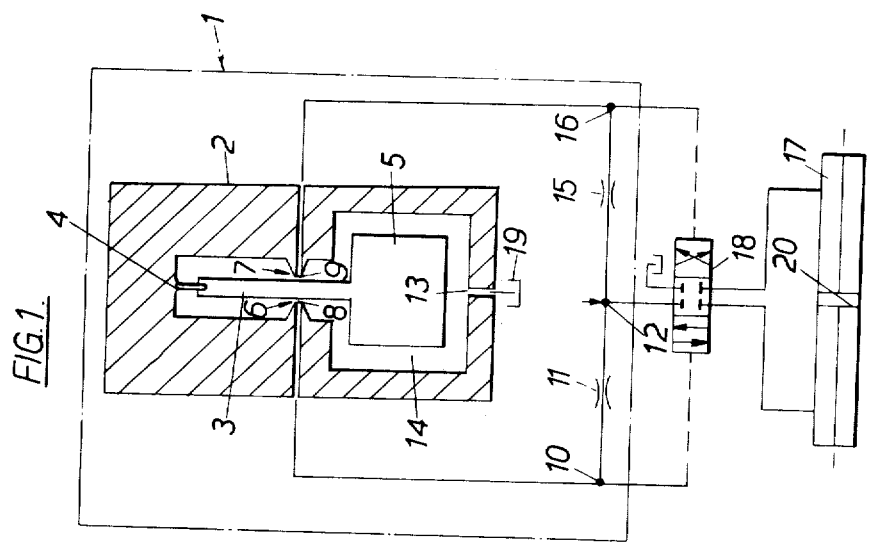
Figure 2:
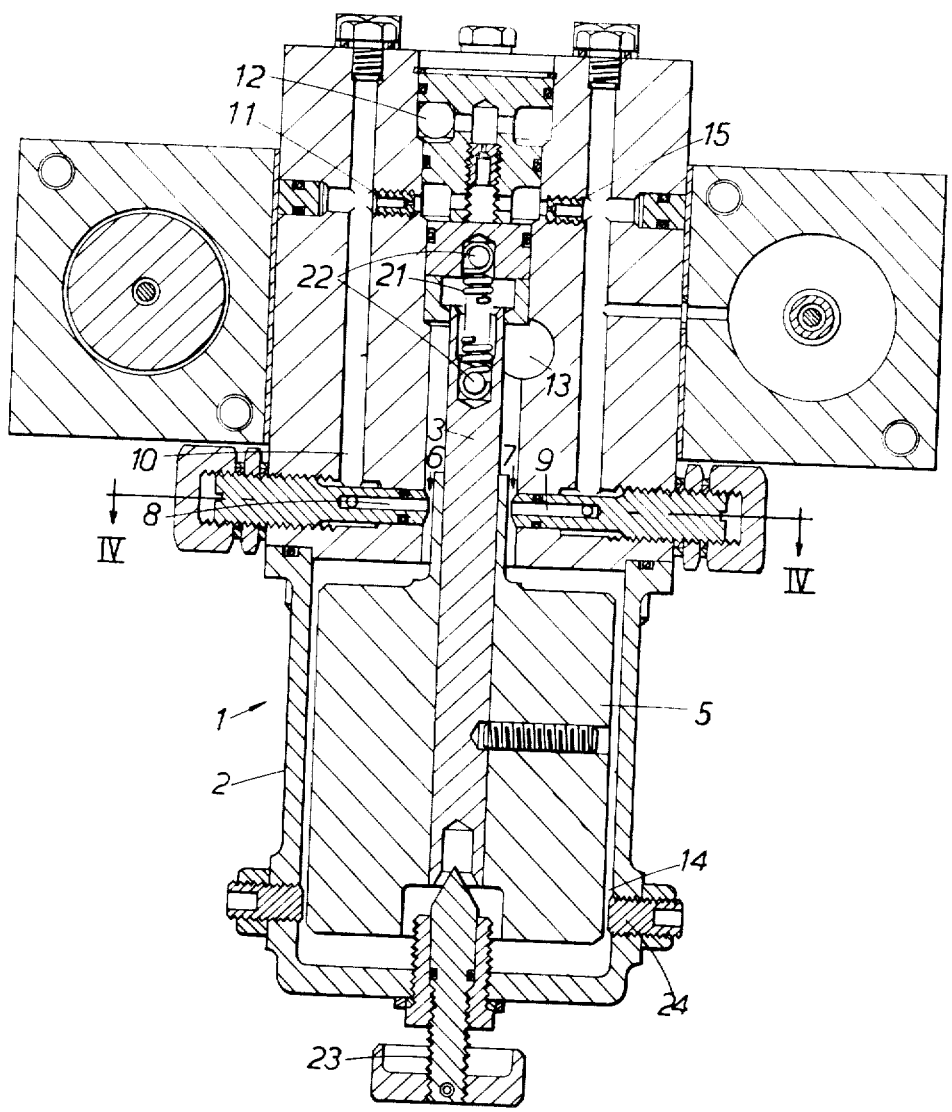
Figure 4:
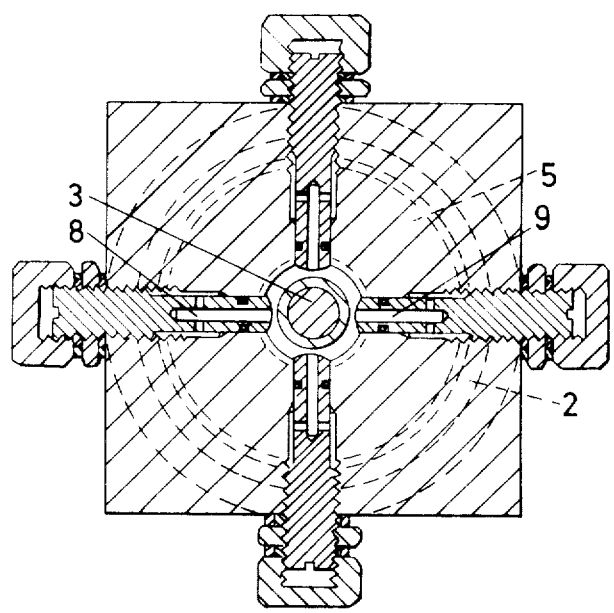

Embodiments of the invention will now be described, by way of example, with reference to the accompanying drawings, in which:

FIG. 1 is a schematic vertical section through one form of valve in accordance with the invention, FIG. 2 is a partly broken-away vertical section through an actual valve in accordance with the invention, FIG. 3 is a schematic section through a second stage valve, and FIG. 4 is a sectional view taken along the line IV—IV of FIG. 2.

Referring to FIG. 1 of the drawing, a valve 1 comprises a housing 2 having therein a pendulum-like member 3 suspended by a pivot or hinge 4 from the housing 2. At its lower end, the member 3 carries a mass 5 which tends to maintain the member 3 in a vertical position irrespective of the attitude of the housing within a range of attitudes.

The member 3 acts as a common obstructing member for two variable restrictors 6 and 7 which include orifices 8 and 9, respectively, in the wall of the housing 2.

The variable restrictor 6 is connected, via a junction 10, in series with a fixed restrictor 11 so that a conduction path for hydraulic fluid exists, between a fluid inlet 12 and an outlet 13, via the two restrictors 11 and 6 and a chamber 14 containing the mass 5. A similar path is provided by a variable restrictor 7, a second fixed restrictor 15 connected in series with the restrictor 7 at a junction 16, and the chamber 14.

The junctions 10 and 16 are connected to opposite ends of a hydraulic actuator 17, either via a second stage valve 18, as shown in FIG. 1, or directly.

When the valve is in use, the inlet 12 is connected to a source of hydraulic fluid under pressure and the outlet 13 is connected to a tank 19, so that fluid flows through the two conduction paths and into the tank. From the tank it is recirculated, by means of a pump (not shown), back to the inlet 12.

If the member 3 is exactly central between the orifices 8 and 9, the pressures at the junctions 10 and 16 will be equal, assuming that the restrictors 11 and 15 are identical and that the orifices 8 and 9 are also identical. There will therefore be no resultant pressure acting upon the valve 18 and hence upon the actuator 17. The piston 20 of the actuator 17 will therefore remain stationary in the actuator cylinder.

If the restrictors are not identical, or if the two paths are for any other reason unsymmetrical, the condition of zero resultant pressure will be achieved with the housing 2 displaced so that the member 3 is slightly off-centre relative to the orifices 8 and 9.

If the housing 2 is tilted clockwise through a small angle in the vertical plane containing the orifices 8 and 9, the orifice 9 will become more obstructed by the member 3, and the orifice 8 will become less obstructed, since the member 3 tends to a vertical position due to the mass 5. The resistance to flow through the right-hand conduction path (as viewed in FIG. 1) will therefore increase and the resistance to flow through the left-hand path will decrease. There will therefore be a pressure differential between the junctions 10 and 16 which will cause the piston 20 to move off-centre.

The movement of the piston 20 may be used to cause the housing 2 to return to its original vertical position, the pressure differential thereby reducing again to zero. The housing 2 could be attached to a further member, for example an instrument table, or a crane body, or a grader blade, or any member which must be maintained horizontal or vertical or at any predetermined intermediate attitude irrespective of the attitude (within predetermined limits) of the means supporting the member. In order to predetermine an intermediate attitude, the valve housing can clearly be mounted at an angle to the further member, so that the further member is at the predetermined attitude when the housing is vertical.

Clearly, if the housing 2 is tilted in an anti-clockwise direction, the actuator will move off-centre in the opposite direction.

Although in the above embodiment two variable restrictors 6 and 7 and two fixed restrictors 11 and 15 are provided to form a "bridge"-type hydraulic circuit analogous to an electrical resistance bridge, an alternative form of valve could include a single variable restrictor and a single fixed restrictor, in a "half-bridge" configuration, the output being taken from the junction between the restrictors and being fed to a second stage valve or an actuator which is biased towards an extreme position. The equilibrium position will then be at the point of balance between the pressure force controlled by the valve 1 and the biasing force.

In an alternative and particularly advantageous embodiment, two half-bridge or full bridge configurations may be used together, by positioning the orifices at approximately 90° spacings round the member 3, so that the member 3 cooperates with all of the orifices to produce two variable output pressures or two pressure differentials, as the case may be, for operating two actuators which cause movement of the housing, or of a member on which the housing is mounted, along two substantially mutually perpendicular axes. Such a configuration could therefore be used to set the member so that it is completely horizontal or completely vertical or at any other predetermined attitude in two substantially mutually perpendicular planes.

FIG. 2 shows a broken-away cross-section through a valve of the last-mentioned type in which there are two full bridge configurations used together with a common pendulum member. Parts corresponding to those in FIG. 1 have the same reference numbers as in that Figure. In this case the hinge for the pendulum member 3 comprises a spring 21 which is attached at its upper and lower ends to a member mounted in the housing 2, and the member 3, respectively, by pins 22. This arrangement allows the mass 5 to swing radially in any direction within the chamber 14 so that the member 3 can cooperate with all of the variable restrictor orifices (two of which are in a plane perpendicular to the plane of the drawing). At the bottom of the housing, a screw 23 can be screwed upwards so that its tapered tip enters a tapered recess in the member 3 to lock the member 3 in a central position for transport purposes. Four threaded plugs 24, positioned around the bottom of the housing 2, are provided as adjustable stops to limit the extent of possible relative radial movement between the mass 5 and the housing.

Various modifications to the valves described above may be made without departing from the scope of the invention. For example, where more than one variable restrictor is provided, separate obstructing members might be used for the respective orifices, all of the members being attached to the pendulum member, or being otherwise positioned by the suspended mass 5. Although the orifices are shown as horizontal and the obstructing member as vertical, clearly these components might be at any suitable angle. For example, the or each obstructing member might comprise a horizontal attachment to the member 3, and a single obstructing member might, for example, comprise a flange on the member 3, which flange cooperates with all of the orifices. The orifices, of which there may be more than two with a corresponding number of conduction paths, may be positioned round the member 3 at any suitable angular spacing.

As mentioned previously, the actuator 17 may be operated via a second stage valve 18. This valve may comprise a flapper and orifice valve which is controlled by the pressure differential at the junctions 10 and 16. Such a valve is shown schematically in FIG. 3 of the drawings.

The valve comprises a housing 25 having two orifices 26 and 27 cooperating with an obstructing member 28. A member 28 is supported in a central position by three diaphragms 29–31, respectively, which divide the housing into four separate chambers 32–35. As in the valve 1 described above, two fluid conduction paths are provided, namely a path from a fluid inlet 36, via a fixed restrictor 37, via the orifice 26 and the chamber 32 to an outlet 38; and a second path from the inlet 36, via a fixed restrictor 39, via the orifice 27 and the chamber 35 to an outlet 40.

The control pressure differential from the first stage valve 1 is fed to inlets 41 and 42 in the housing 25, which inlets communicate with the chambers 33 and 34, respectively. The diaphragms 29 and 31 are of smaller effective area than the diaphragm 30, so any difference in pressures in the chambers 33 and 34, caused by operation of the first stage valve, causes the member 28 to move towards one orifice or the other, depending upon which chamber 33 or 34 contains the higher pressure.

As in the first stage valve, a pressure differential is produced at junctions 43 and 44 between the fixed and variable restrictors in the two paths, respectively. This pressure differential can operate the actuator 17 as previously described.

Such a valve 18 may be situated remotely from the first stage valve 1 and/or the actuator 17. The valve may be used in place of a second stage spool valve if hysteresis is to be kept to a minimum, although some hydraulic losses may be experienced.

It may not be necessary, for example when using the first stage valve to control the levelling of a heavy piece of equipment, to use a double-acting actuator. The second stage valve could then be a pilot-operated three-port spool valve or a half-bridge flapper and orifice valve using only a single conduction path with single fixed and variable restrictors. When a half-bridge or three-port second stage valve is used, the cylinder may be differentially operated by applying the full hydraulic pressure permanently to a small piston area and opposing the resultant force by applying the variable pressure from the second stage valve to a larger area.

We claim:
1. A control valve including
   a. a support member,
   b. fluid inlet means,
   c. fluid outlet means,
   d. a first pair of fluid conduction paths connected in parallel between the inlet and outlet, each said path containing a fixed restrictor connected in series with a variable resistor, there being a junction between said restrictors, each variable restrictor in- cluding an orifice which is movable with the support member and which cooperates with obstructing means to control the resistance to the flow of fluid through the respective path, the obstructing means being held substantially in a predetermined attitude by a mass suspended from the support member so that the attitude of the obstructing means is substantially independent of the attitude of the support member within a range of attitudes, whereby a fluid pressure differential between the junctions of the paths varies with the attitude of the support member within said range; and e. a second pair of fluid conduction paths as aforesaid, each having a said orifice in a plane at an angle to the aforesaid orifices, the obstructing means of said second pair of paths also being held substantially in a predetermined attitude by said mass.

2. A valve as claimed in claim 1, in which the mass is suspended from the support member by spring means.

3. A valve as claimed in claim 1, in which the support member comprises a valve housing.

4. A valve as claimed in claim 1, in which said obstructing means comprises a cylindrical portion of said mass, around which portion all of said orifices are positioned to direct the flow of fluid towards the surface of said portion.

5. A valve as claimed in claim 4, in which all of said orifices are spaced round said portion at substantially 90° intervals, the orifices of said first pair of paths being substantially diametrically opposite each other relative to said portion.

6. A hydraulic control system, including a control valve as claimed in claim 1, each said pair of paths being connected to cause operation of respective hydraulic actuator means.

7. A system as claimed in claim 6, in which the control valve causes operation of each said actuator means via a respective second stage valve.

8. A system as claimed in claim 7, in which each second stage valve comprises a housing; a control member the ends of which are differentially movable between respective fluid inlet orifices; first and second diaphragms supporting the control member within the housing adjacent the ends of the control member and forming boundaries of two chambers into which said fluid flows from said inlet orifices; a fluid outlet from each said chamber; a third diaphragm having a larger pressure sustaining area than said first and second diaphragms and supporting the control member at a position between the first and second diaphragms; and means for applying said pressure differential from said control valve to spaces contained within the housing and between the first and third and the second and third diaphragms, respectively, to set the position of the control member relative to said two inlet orifices to provide an output pressure differential at said inlet orifices for causing operation of said actuator.

* * * * *